United States Patent [19]

Groezinger

[11] Patent Number: 5,115,477
[45] Date of Patent: May 19, 1992

[54] IMAGE RECOGNITION EDGE DETECTION METHOD AND SYSTEM

[75] Inventor: John L. Groezinger, Madison, Wis.

[73] Assignee: Honeywell Inc., Minneapolis, Minn.

[21] Appl. No.: 652,409

[22] Filed: Feb. 7, 1991

Related U.S. Application Data

[63] Continuation of Ser. No. 175,558, Mar. 31, 1988, abandoned.

[51] Int. Cl.⁵ .............................................. G06K 9/00
[52] U.S. Cl. ............................................ 382/22; 382/8; 382/48
[58] Field of Search .................. 382/1, 8, 22, 41, 48, 382/50; 358/101, 106, 107

[56] References Cited

U.S. PATENT DOCUMENTS

| | | | |
|---|---|---|---|
| 4,220,972 | 9/1980 | Geokezas et al. | 358/113 |
| 4,519,041 | 5/1985 | Fant et al. | 382/22 |
| 4,561,104 | 12/1985 | Martin | 382/8 |
| 4,606,066 | 8/1986 | Hata et al. | 382/41 |

Primary Examiner—David K. Moore
Assistant Examiner—Jose L. Couso
Attorney, Agent, or Firm—Robert B. Leonard

[57] ABSTRACT

A system and method for delineating the edges of an object in an image frame formed of a two dimensional array of pixels represented by a plurality of gray scale values representing the gray scales of the pixels. A reference contrast level based on the distribution of contrast levels between contiguous pixels is established, and the contrast levels of pairs of pixels in square groupings of four contigous pixels are compared with the reference contrast level. A two dimensional array of elements corresponding to the arrangement of the square groupings of pixels is formed in which each element has a first value only if the contrast level between a pair of pixels in a square grouping is greater than the reference contrast level.

4 Claims, 4 Drawing Sheets

IMAGE RECOGNITION EDGE DETECTION METHOD AND SYSTEM

This application is a continuation of application Ser. No. 07/175,558, filed Mar. 31, 1988, now abandoned.

BACKGROUND OF THE INVENTION

The invention disclosed herein relates generally to image recognition methods and systems, and more specifically to a simple, low cost edge extraction operator to convert gray scale information into binary edge information necessary to allow measurement and data acquisition.

A machine vision system is known which performs certain functions in the gray scale domain. After these functions have been performed, a technique to convert the gray scale information to useful binary information is needed to allow measurement and data acquisition of a scene.

The majority of a scene is frequently relatively uniform background around a single object of interest. In addition, much of the view of an object within its edges may be uniform and not useful for detection, recognition and inspection purposes. Thus, in many instances, only the location of the edges of an object is necessary for performance of a required task.

The applicant has devised a unique, simple and low cost technique which implements an edge extraction operator to convert the scene from gray scale to binary. The technique may be used to find the edges of any object, given raw gray scale data. It does not require user selection of parameters to determine edge detection, is highly speed efficient and may be implemented in hardware or software. The technique optimizes thresholding based on local scene illumination and has a high degree of tolerance to illumination changes and local variance. It is not dependent on the placement or size of windows used to qualify data in a scene, and may be used in whole or in part to determine simple thresholding as applied to raw gray scale data. Finally, the edge detection technique is direction independent.

SUMMARY OF THE INVENTION

The present invention is a method and apparatus for determining and representing the edges of an object in an image frame formed of a two dimensional array of pixels represented by an array of gray scale values, each gray scale value representing the gray scale of a separate pixel. The method basically comprises the steps of establishing a reference contrast level based on the distribution of differences between gray scale values of pairs of contiguous pixels in the image frame, examining groups of gray scale values, the groups corresponding to square groupings of four contiguous pixels, and producing a two dimensional array of elements arranged to correspond to the square groupings of four contiguous pixels, each element in the array having either a first or a second value, the first value occurring only if the difference between a pair of values in the group of gray scale values corresponding to a square grouping of four contiguous pixels is at least as great as the reference contrast level. The reference contrast level may be established by examining the gray scale values of all pairs of contiguous pixels in the image frame, determining the distribution of differences in gray scale values, and then selecting as the reference contrast level the difference level which is the last of a predetermined number of successive difference levels each of which exceeds the next smaller difference level by at least a predetermined amount.

Apparatus according to the invention basically comprises reference determining means for establishing a reference contrast level based on the distribution of differences between gray scale values of pairs of contiguous pixels in the image frame and means for examining groups of gray scale values, the groups corresponding to square groupings of four contiguous pixels in an array of pixels forming a image frame, the latter means also producing a two dimensional array of elements arranged to correspond to the arrangement of the square groupings of four contiguous pixels, each element in the array having either a first or a second value, the first value occurring only if the difference between the gray scale values of a pair of pixels in a square grouping is at least as great as the reference contrast level.

DESCRIPTION OF THE PREFERRED EMBODIMENT

The present invention may be used with a matrix of any number of pixels. A greater number of pixels produces higher resolution and a more precise image of the object of interest. However, a greater number of pixels also requires more memory and data processing capability.

Figure 1:
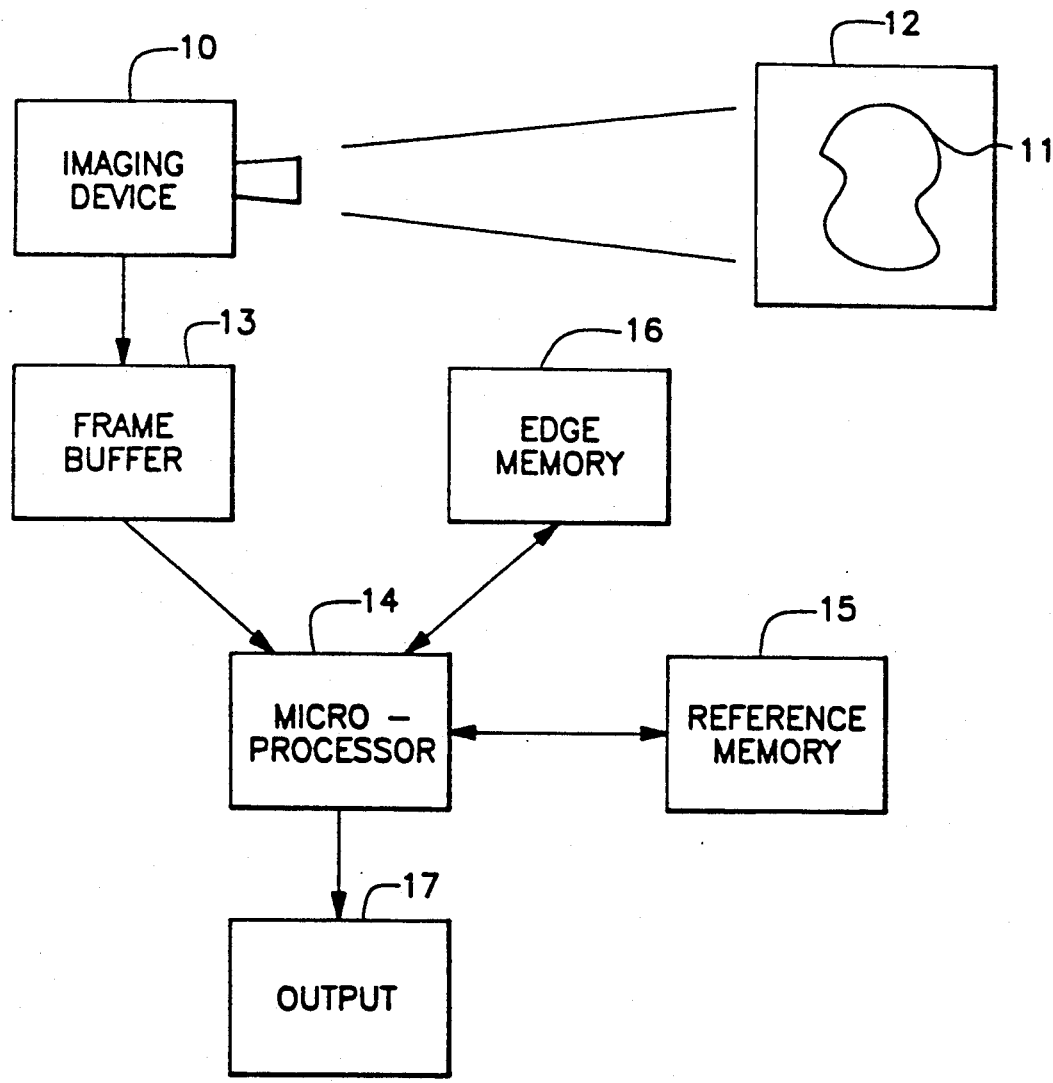
FIG. 1 is a block diagram of an image recognition edge detection system in accordance with the present invention.

FIG. 1 illustrates a typical machine vision system including an imaging device 10 for viewing an object 11 within an image frame 12. Device 10 produces binary signals sequentially indicative of the gray scales of the pixels forming image frame 12. The array of gray scale values is transmitted to an frame buffer 13 under the control of a microprocessor 14 which operates as directed by software, and which, among other things, implements the contrast level distribution algorithm of FIG. 2, the reference contrast level determining algorithm of FIG. 3 and the edge indicating algorithm of FIG. 4.

Figure 2:
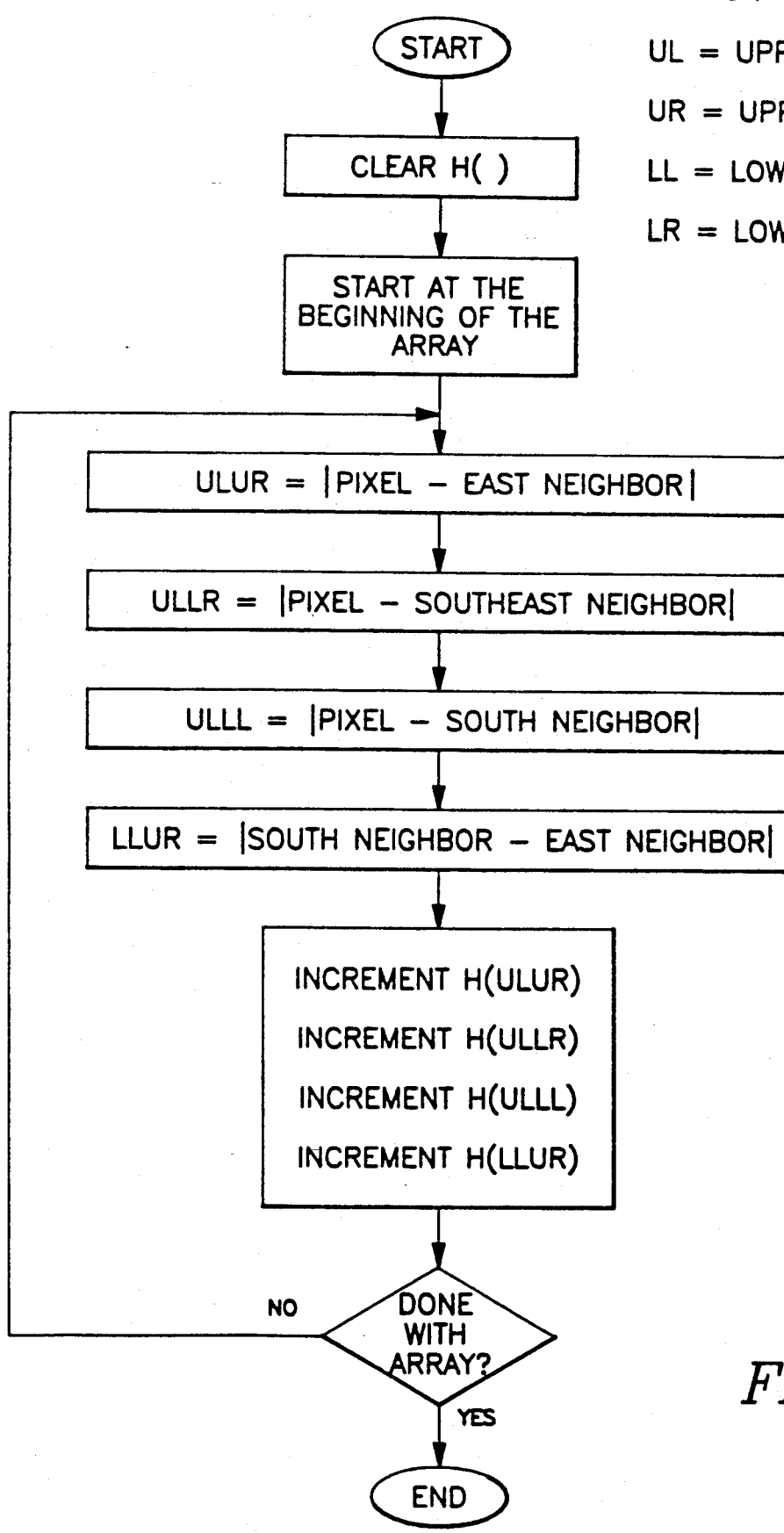
FIG. 2 is a logic and flow diagram of an algorithm used in the system of FIG. 1 for determining the distribution of contrast levels between pairs of contiguous pixels in an array of pixels forming an image frame.

A reference memory 15 under the control of microprocessor 14 is used to store the reference contrast level resulting from implementation of the reference determining algorithm of FIG. 2. An edge memory 16 also under the control of microprocessor 14, functions to store an array of elements resulting from implementation of the edge indicating algorithm of FIG. 4, each of the array of elements having first or second values, the first value occurring only if a corresponding square grouping of four contiguous pixels is determined to contain an edge of the object. Once the edges of the object have been determined, as represented by the contents of edge memory 16, the edges of the object may be displayed on or used in an output device 17.

The concept implemented in the system of FIG. 1 is, after an image is acquired, to store the raw gray scale information in a two dimensional array $G(x, y)$ formed of a range of values from a to b in a matrix of size $m \times n$. This information is used to generate a binary image $G'(x, y)$ which is formed only of values c and d where c indicates an edge of an object in the image frame and d indicates foreground and/or background of the object. A modified version of the Robert's Gradient operator is applied to the raw gray scale data $G(x, y)$ to determine certain operator parameters, and, ultimately, to generate the edge matrix $G'(x, y)$.

The following is a description of the algorithms which implement the process used to determine the binary edge data. First, a histogram of data $H(g)$ is acquired by a first derivative method which is modified to act directionally. There are g quantized gray levels in the original image having values from a to b inclusive. The histogram is acquired by computing the contrast levels or differences in gray scale levels between every pair of contiguous pixels forming the image frame. As set forth Algorithm 1 below and in FIG. 2, this may be done by sequentially examining square groupings of four contiguous pixels. The first portion of the instructions in Algorithm 1 accomplishes this operation. The numbers of samples of each of the g discrete gray scale levels are accumulated to determine this distribution. This is accomplished by the remaining instructions in Algorithm 1.

For purposes of the algorithms set forth below and the corresponding flow diagrams, the following shorthand notation is used to identify particular pixels in a square grouping of four pixels:
UL = upper left
UR = upper right
LL = lower left
LR = lower right

---

Algorithm 1

```
H(g) = 0
do for y index = 0 to n - 2
    do for x index = 0 to m - 2
        ULUR = G(xindex, yindex) - G(xindex +
        1, yindex)
        ULLR = G(xindex, yindex) - G(xindex +
        1, yindex + 1)
        ULLL = G(xindex, yindex) - G(xindex,
        yindex + 1)
        LLUR = G(xindex, yindex +1) - G(xindex +
        1, yindex)
        H(ULUR) = H(ULUR) + 1
        H(ULLR) = H(ULLR) + 1
        H(ULLL) = H(ULLL) + 1
        H(LLUR) = H(LLUR) + 1
    end
end
```

---

Figure 3:
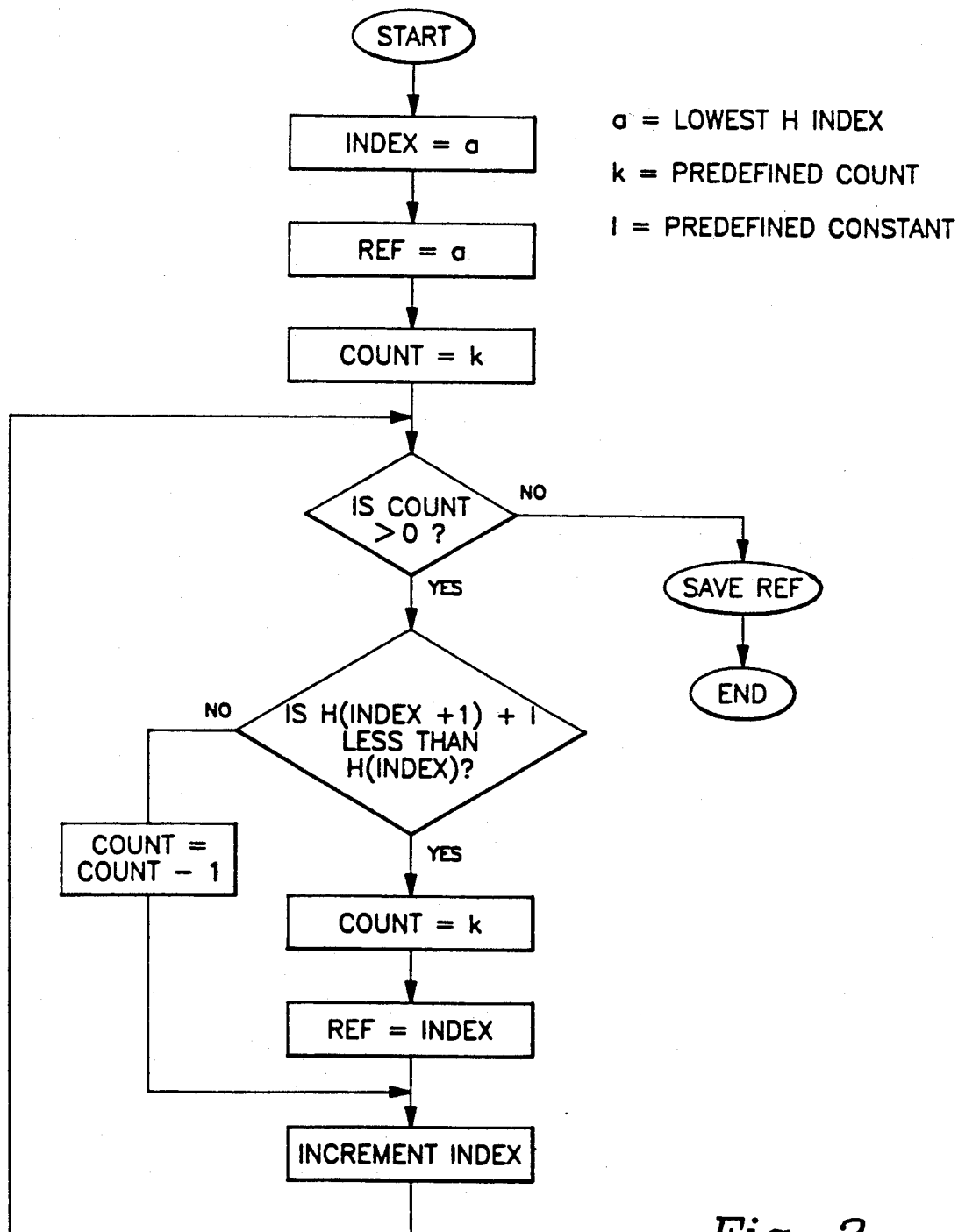
FIG. 3 is a logic and flow diagram of an algorithm used in the system of FIG. 1 for establishing a reference contrast level from the distribution of contrast levels.
Figure 4:
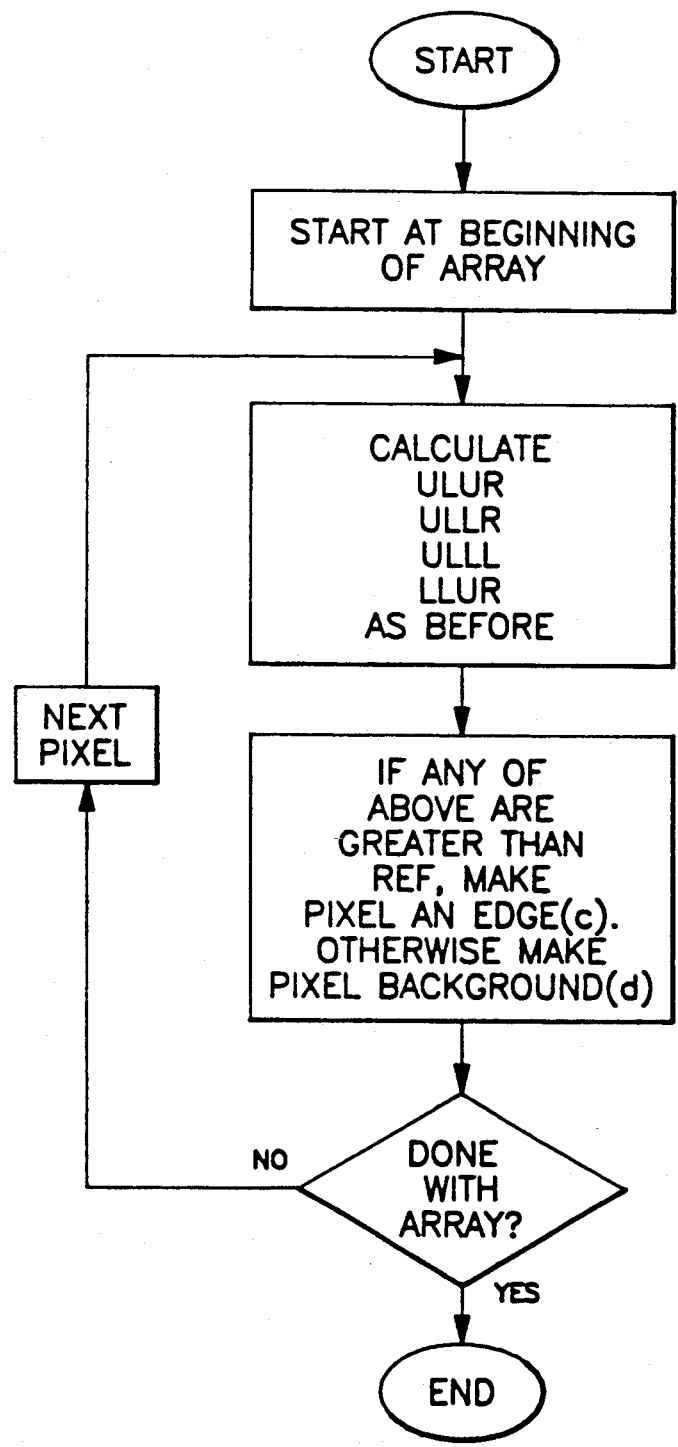
FIG. 4 is a logic and flow diagram of an algorithm used in the system of FIG. 1 for designating the edges of an object in an image frame.

The contrast level distribution data is used to determine the appropriate contrast level of thresholding according to the following statistical extraction (Algorithm 2) which can be implemented with the flow diagram of FIG. 3.

k and l are predetermined constants independent of the operation being performed.

---

Algorithm 2 gindex = a

---

Algorithm 2 -continued

```
reference = H(a)
counter = k
while counter > 0 do
    if H(gindex + 1) + 1 < H(gindex) then
        counter = k
        reference = gindex
    else
        counter = counter - 1
        gindex = gindex + 1
end
```

---

This algorithm examines the distribution of contrast levels in a particular order (e.g., in order of increasing contrast levels) to detect k successive contrast levels in which the number of sample having a particular contrast level exceeds by at least l samples the number of samples having the next smaller contrast level. Once a contrast level meeting these conditions is found, it is established as the reference contrast level. This contrast level is deemed to be the optimum value for thresholding to be applied to a final operation as described hereinafter.

The final operation again examines the gray scale values of square groupings of four contiguous pixels, and, for each group, calculates the difference between every combination of pairs of values. These differences are then compared to the reference contrast level, and the comparison used to produce a two dimensional array of elements arranged to correspond to the arrangement of the square groupings of four contiguous pixels. Each of the elements in this array has a first value c only if the contrast level between a pair of pixels in a square grouping of four contiguous pixels is at least as great as the reference contrast level, this condition representing an edge of the object in the image frame. All other elements in the two dimensional array are set to a second or background value d. The foregoing operation is accomplished by means of following Algorithm 3 which is implemented in accordance with the flow diagram of FIG. 4.

---

Algorithm 3

```
do for yindex = 0 to N-2
    do for xindex = 0 to m-2
        ULUR = G(xindex, yindex) - G(xindex +
        1, yindex)
        ULLR = G(xindex, yindex) - G(xindex +
        1, yindex + 1)
        ULLL = G(xindex, yindex) - G(xindex,
        yindex +1)
        LLUR = G(xindex, yindex + 1) - G(xindex +
        1, yindex)
        if (ULUR > =reference) or (ULLR > =
        reference) or
            (ULLL > =reference) or (LLUR > =
            reference) then
            G' (xindex, yindex) = c
        else
            G' (xindex, yindex) = d
    end
end
```

---

In accordance with the foregoing description, the applicant has provided a unique system and method for extracting object edge information from an image formed of an array of pixels of discreet gray scale values. The method and system are simple and require relatively little memory and processing capability, thus contributing to low cost of the system. Although a particular embodiment of the system is shown for illustrative purposes, other modifications and variations will be apparent to those of ordinary skill in the relevant arts. It is not intended that coverage be limited to the illustrated embodiment, but only by the terms of the following claims.

I claim:

1. In a system in which an image frame formed of a two dimensional array of pixels is represented by a plurality of gray scale values, each gray scale value representing a gray scale of a separate pixel in the image frame, means for determining the edges of an object in the image frame, comprising:

reference determining means for establishing a reference contract level based on the distribution of differences between gray scale and values of pairs of contiguous pixels in the image frame said reference determining means comprising means for examining the distribution of differences between gray scale values of pair of contiguous pixels, and establishing as the reference contrast level the difference level which is the last of a predetermined number of successive difference levels each of which exceeds the next smaller difference level by at least a predetermined amount, said reference determining means comprising additional means for examining groups of gray scale values, the groups corresponding to square groupings of four contiguous pixels, and, for each group, calculating the differences between every combination of pairs of gray scale values, said means for examining groups of gray scale values further determining the distribution of differences between gray scale values of pairs of contiguous pixels; and means for examining groups of gray scale values, the groups corresponding to square groupings of four contiguous pixels, and producing a two dimensional array of elements arranged to correspond to the arrangement of square groupings of four contiguous pixels, each element in the array having either a first or second value, the first value occurring only if the difference between gray scale values corresponding to a pair of pixels in a square grouping of four contiguous pixels is greater than the reference contrast level, whereby the first values are arranged to represent the edges of the object in the image frame.

2. The system of claim 1 wherein said means for examining groups of gray scale values sequentially examines square groupings of four contiguous pixels by row and column of groups of pixels in the order of the difference between the gray scale values of the upper left and upper right pixels, the upper left and lower right pixels, the upper left and lower left pixels and the lower left and upper right pixels for each of the square groupings, said means for examining groups of gray scale values further being operable to produce the first value for the element in the two dimensional array if any of the differences for the corresponding square grouping of pixels is at least as great as the reference contrast level, and to produce the second value for the element in the two dimensional array if all of the differences for the corresponding square grouping of pixels are less than the reference contrast level.

3. A method for determining and representing the edges of an object in an image frame formed of a two dimensional array of pixels represented by a plurality of gray scale values, each gray scale value representing the gray scale of a separate pixel in the image frame, the method comprising the steps of:

establishing a reference contrast level based on the distribution of differences between gray scale values of pairs on continuous pixels in the image frame, the step of establishing a reference contrast level comprising the steps of examining the distribution of differences between gray scale values and establishing as the reference contrast level the difference level which is the last of a predetermined number of successive difference levels each of which exceeds the next smaller difference level by at least a predetermined amount;

examining groups of gray scale values corresponding to square groupings of four contiguous pixels, the step of examining the distribution of differences between gray scale values including the steps of examining groups of gray scale values corresponding to square groupings of four contiguous pixels, calculating for each group the differences between each combination of pairs of gray scale values, determining the distribution of differences in gray scale values in order of increasing difference, examining the distribution of differences in gray scale values for a plurality of successive difference levels, each of which exceeds the next smaller difference level by at least a predetermined amount and selecting the difference level which is the last of a predetermined number of difference levels in the succession as the reference contrast level;

calculating for each group the differences between each combination of pairs of gray scale values; and producing a two dimensional array of elements arranged to correspond to the arrangement of square groupings of four contiguous pixels, each element in the array of elements having either a first or a second value, the first value occurring only if a difference between gray scale values of a pair of pixels in the corresponding square grouping is at least as great as the reference contrast level, whereby the first values are arranged to represent the edges of the object in the image frame.

4. The method of claim 3 wherein the step of examining groups of gray scale values comprises sequentially examining square groupings of four contiguous pixels in sequence by row and column of groupings of pixels and calculating the differences in gray scale values in the order of the upper left and upper right pixels, the upper lift and lower right pixels, the upper left and lower left pixels and the lower left and upper right pixels for each of the square groupings.

* * * * *